(12) United States Patent
Kishiro et al.

(10) Patent No.: US 11,274,578 B2
(45) Date of Patent: Mar. 15, 2022

(54) SEALING DEVICE AND MANUFACTURING METHOD THEREFOR

(71) Applicant: NOK CORPORATION, Tokyo (JP)

(72) Inventors: Masamichi Kishiro, Fukushima (JP); Nobuhiro Nishimura, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/954,844

(22) PCT Filed: Feb. 6, 2019

(86) PCT No.: PCT/JP2019/004223
§ 371 (c)(1),
(2) Date: Jun. 17, 2020

(87) PCT Pub. No.: WO2019/159785
PCT Pub. Date: Aug. 22, 2019

(65) Prior Publication Data
US 2021/0095581 A1 Apr. 1, 2021

(30) Foreign Application Priority Data

Feb. 19, 2018 (JP) .............................. JP2018-026838

(51) Int. Cl.
*F01L 3/08* (2006.01)
*F16J 15/3232* (2016.01)

(52) U.S. Cl.
CPC ............. *F01L 3/08* (2013.01); *F16J 15/3232* (2013.01); *F01L 2303/00* (2020.05)

(58) Field of Classification Search
CPC ....... F01L 2303/00; F01L 3/08; F16J 15/3232
See application file for complete search history.

(56) References Cited

U.S. PATENT DOCUMENTS

| 6,227,548 | B1 | 5/2001 | Netzer |
| 2014/0377057 | A1 | 12/2014 | Oiyama |
| 2017/0009616 | A1* | 1/2017 | Shishido ................ B21D 39/04 |

FOREIGN PATENT DOCUMENTS

| EP | 3 098 487 A1 | 11/2016 |
| JP | 2002-103879 A | 4/2002 |

(Continued)

OTHER PUBLICATIONS

"Notching," Wikipedia, https://en.wikipedia.org/w/index.php?title=Notching&oldid=688682037, Nov. 2, 2015 (Year: 2015).*

(Continued)

*Primary Examiner* — Kevin A Lathers
(74) *Attorney, Agent, or Firm* — Greenblum & Bernstein, P.L.C.

(57) ABSTRACT

A sealing device seals a rod having a cylindrical part and a cylindrical guide that guides reciprocation of the rod in an axial direction of the rod. The sealing device includes an elastic ring formed of an elastic material, and a rigid ring formed of a rigid material fixed to the elastic ring for reinforcing the elastic ring. The elastic ring includes a lip with which an outer peripheral surface of the rod is in slidable contact. The rigid ring includes a rigid-ring cylindrical part located radially outside an end portion of the guide. The rigid-ring cylindrical part includes multiple hook hasps engaged into at least one recess formed on an outer peripheral surface of the guide. Each of the multiple hook hasps includes a root portion and a distal end portion located radially inward of the root portion and fitted into the recess. A thin portion is formed at the root portion of the hook hasp, the thin portion being thinner than other parts of the hook hasp.

4 Claims, 6 Drawing Sheets

(56) References Cited

FOREIGN PATENT DOCUMENTS

| JP | 2002103879 A | * | 4/2002 |
| JP | 2016-61347 A | | 4/2016 |
| WO | WO 2015/111505 A1 | | 7/2015 |

OTHER PUBLICATIONS

ISR for PCT/JP2019/004223, dated Aug. 22, 2019.
Japanese Office Action received in JP Patent Application No. 2020-500432 dated Mar. 2, 2021, and English language translation thereof.
Extended European Search report received in EP Application No. 19755173.2 dated Feb. 25, 2021.
First Office Action in CN Application No. 201980007332.3 dated Oct. 8, 2021, with partial English language translation thereof.

* cited by examiner

SEALING DEVICE AND MANUFACTURING METHOD THEREFOR

TECHNICAL FIELD

The present invention relates to sealing devices and to manufacturing methods therefor.

BACKGROUND ART

An intake valve and an exhaust valve are respectively arranged in an intake port and an exhaust port of an internal combustion engine, such as a gasoline engine or a diesel engine, used in automobiles, ships, agricultural machinery, etc. Each valve includes a valve stem and a valve-stem guide that guides the valve stem so as to reciprocate in the axial direction. Valve stem seals (sealing devices) are used to limit engine oil from entering the clearance between the valve stem and the valve-stem guide. The valve-stem seal allows ambient engine oil to flow into the clearance between the valve stem and the valve-stem guide for lubricating the valve stem and valve-stem guide. However, in order to reduce or prevent the generation of white smoke caused by engine oil and to reduce consumption of engine oil, the valve-stem seal appropriately suppresses the amount of engine oil flowing into the clearance between the valve stem and the valve-stem guide.

It is known that a high pressure in the combustion chamber of the internal combustion engine is applied to the valve-stem seal through the clearance. In particular, a high pressure in the exhaust stroke is applied to the valve-stem seal provided in the exhaust port.

In recent years, an internal combustion engine having a higher pressure in the combustion chamber has been used due to the use of a turbocharger or the like. Therefore, there is an increasing demand for a valve-stem seal that is unlikely to come off from the valve-stem guide.

Patent Document 1 discloses a valve-stem seal including a part formed of an elastic material and a reinforcing ring. The part formed of the elastic material has a lip that is in contact with the outer peripheral surface of the valve stem and another lip that is in contact with the end surface of the valve-stem guide. A concave portion is formed on the outer peripheral surface of the valve-stem guide, and a locking convex portion is formed on the reinforcing ring. The locking convex portion of the reinforcing ring is fitted into the concave portion of the valve-stem guide, so that the valve-stem seal is prevented from coming off from the valve-stem guide even when high pressure is applied.

BACKGROUND DOCUMENTS

Patent Documents

Patent Document 1: International Publication WO2015/111505

SUMMARY OF THE INVENTION

When adopting the structure of Patent Document 1, it is preferable that the outer peripheral surface of the valve-stem guide not be damaged when the valve-stem seal is attached to the valve-stem guide.

In addition, a piston-type fuel pump may have a sealing device similar to a valve-stem seal. When this sealing device is attached to the piston guide, it is preferable that the outer peripheral surface of the piston guide not be damaged.

Accordingly, the present invention provides a sealing device that is unlikely to damage the outer peripheral surface of a guide for a rod when it is mounted on the guide, and a method for manufacturing the same.

A sealing device according to an aspect of the present invention is a sealing device for sealing a rod having a cylindrical part and a cylindrical guide that guides reciprocation of the rod in an axial direction of the rod, including: an elastic ring formed of an elastic material; and a rigid ring formed of a rigid material fixed to the elastic ring for reinforcing the elastic ring, the elastic ring including a lip with which an outer peripheral surface of the rod is in slidable contact, the rigid ring including a rigid-ring cylindrical part located radially outside an end portion of the guide, the rigid-ring cylindrical part including multiple hook hasps engaged into at least one recess formed on an outer peripheral surface of the guide, each of the multiple hook hasps including a root portion and a distal end portion located radially inward of the root portion and fitted into the recess, a thin portion being formed at the root portion of the hook hasp, the thin portion being thinner than other parts of the hook hasp.

In accordance with this aspect, since the thin portions are formed at the root portions of the hook hasps of the rigid-ring cylindrical part that are engaged into the recess formed on the outer peripheral surface of the guide, the hook hasps have great flexibility. When the sealing device is mounted on the guide for the rod, the hook hasps of the rigid-ring cylindrical part are slid on the outer peripheral surface of the guide. At this time, since the hook hasps, particularly the thin portions, are bent, they are unlikely to damage the outer peripheral surface of the guide.

DESCRIPTION OF EMBODIMENTS

Hereinafter, with reference to the accompanying drawings, an embodiment according to the present invention will be described.

Figure 1:
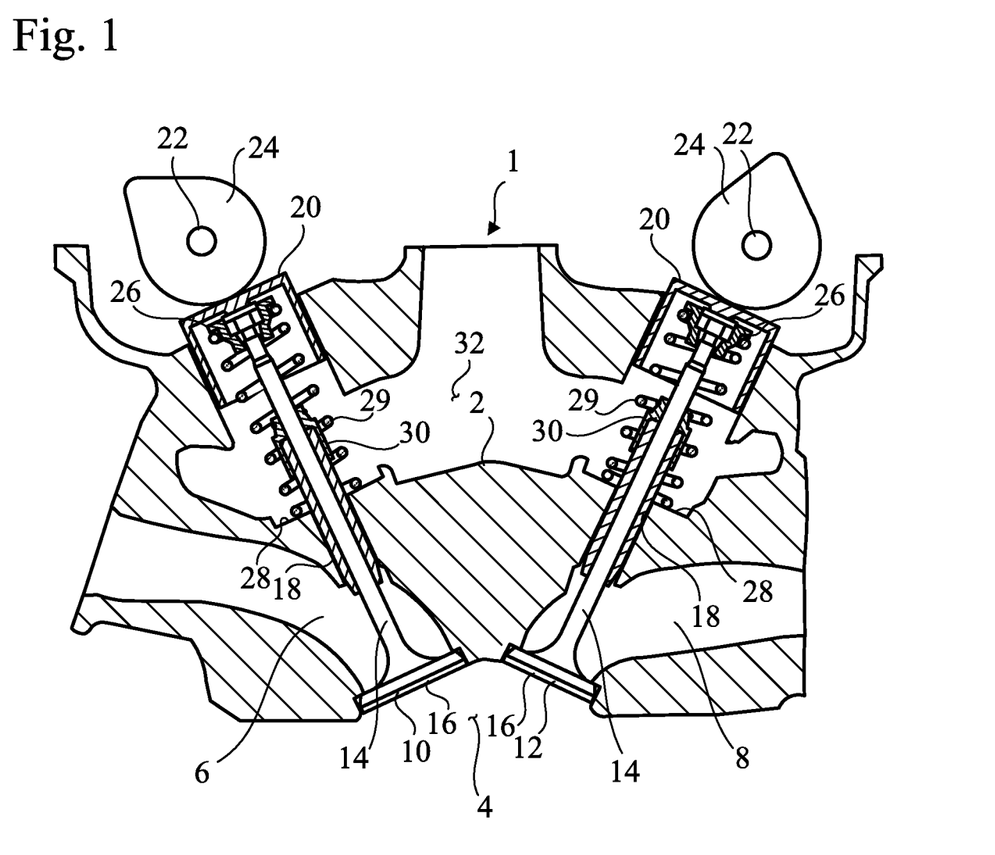
FIG. 1 is a cross-sectional view of a part of an internal combustion engine in which a sealing device according to an embodiment of the present invention is used.

As shown in FIG. 1, an internal combustion engine 1 in which the sealing structure according to an embodiment is used includes a cylinder head 2. The cylinder head 2 is located above a cylinder (not shown). A piston (not shown) is located inside the cylinder so as to be able to reciprocate.

The cylinder head 2, the cylinder, and the piston define a combustion chamber 4. An intake port 6 and an exhaust port 8 are formed in the cylinder head 2, and an intake valve 10 and an exhaust valve 12 are located in the intake port 6 and the exhaust port 8, respectively.

Each of the intake valve 10 and the exhaust valve 12 has a cylindrical valve stem (rod) 14 and a valve head 16 attached to the lower end of the valve stem 14. Each valve can reciprocate in the axial direction of the valve stem 14, and the valve head 16 opens and closes the port 6 or 8 due to the reciprocation. A cylindrical valve-stem guide (guide) 18 that guides the reciprocating motion of each valve stem 14 is fixed to the cylinder head 2, whereas the valve stem 14 is inserted into the valve-stem guide 18.

A cam follower 20 is attached to the upper end of each valve stem 14. A cam 24 attached to the camshaft 22 is in contact with the upper surface of the cam follower 20.

Furthermore, a spring seat 26 is attached to the upper end of each valve stem 14. A coil spring 29 is located in a compressed state between the spring seat 26 and a spring seat 28 that is formed on the cylinder head 2. The elastic restoring force of the coil spring 29 is always exerted in a direction for lifting the valve stem 14 upward.

In the above configuration, when the cam 24 pushes down the cam follower 20 against the elastic restoring force of the coil spring 29 due to the rotation of the camshaft 22, the valve stem 14 is lowered, so that the port 6 or 8 is opened. When the force by which the cam 24 pushes down the cam follower 20 decreases due to the rotation of the cam shaft 22, the valve stem 14 is raised by the elastic restoring force of the coil spring 29, so that the port 6 or 8 is closed.

The end of the valve-stem guide 18 and the center of the valve stem 14 are covered with a valve-stem seal (sealing device) 30. The valve-stem seal 30 allows the engine oil in the surrounding oil chamber 32 to flow into the clearance between the valve stem 14 and the valve-stem guide 18 (clearance Ga in FIGS. 2 and 3), for lubricating the valve stem 14 and the valve-stem guide 18. However, in order to reduce or prevent the generation of white smoke caused by engine oil and to reduce the consumption of engine oil, the valve-stem seal 30 appropriately suppresses the amount of engine oil flowing into the clearance between the valve stem 14 and the valve-stem guide 18.

Figure 2:
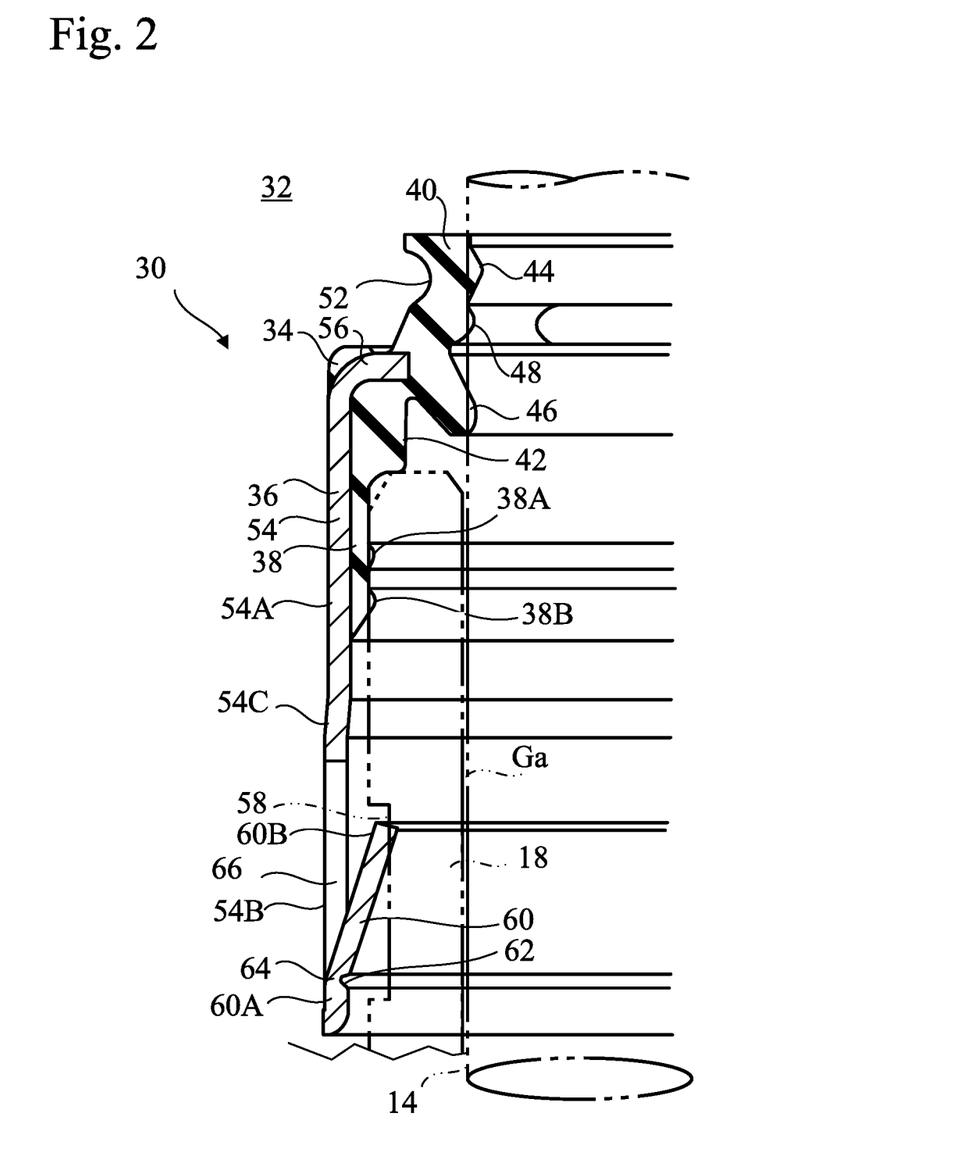
FIG. 2 is a cross-sectional view showing the sealing device according to the embodiment.
Figure 3:
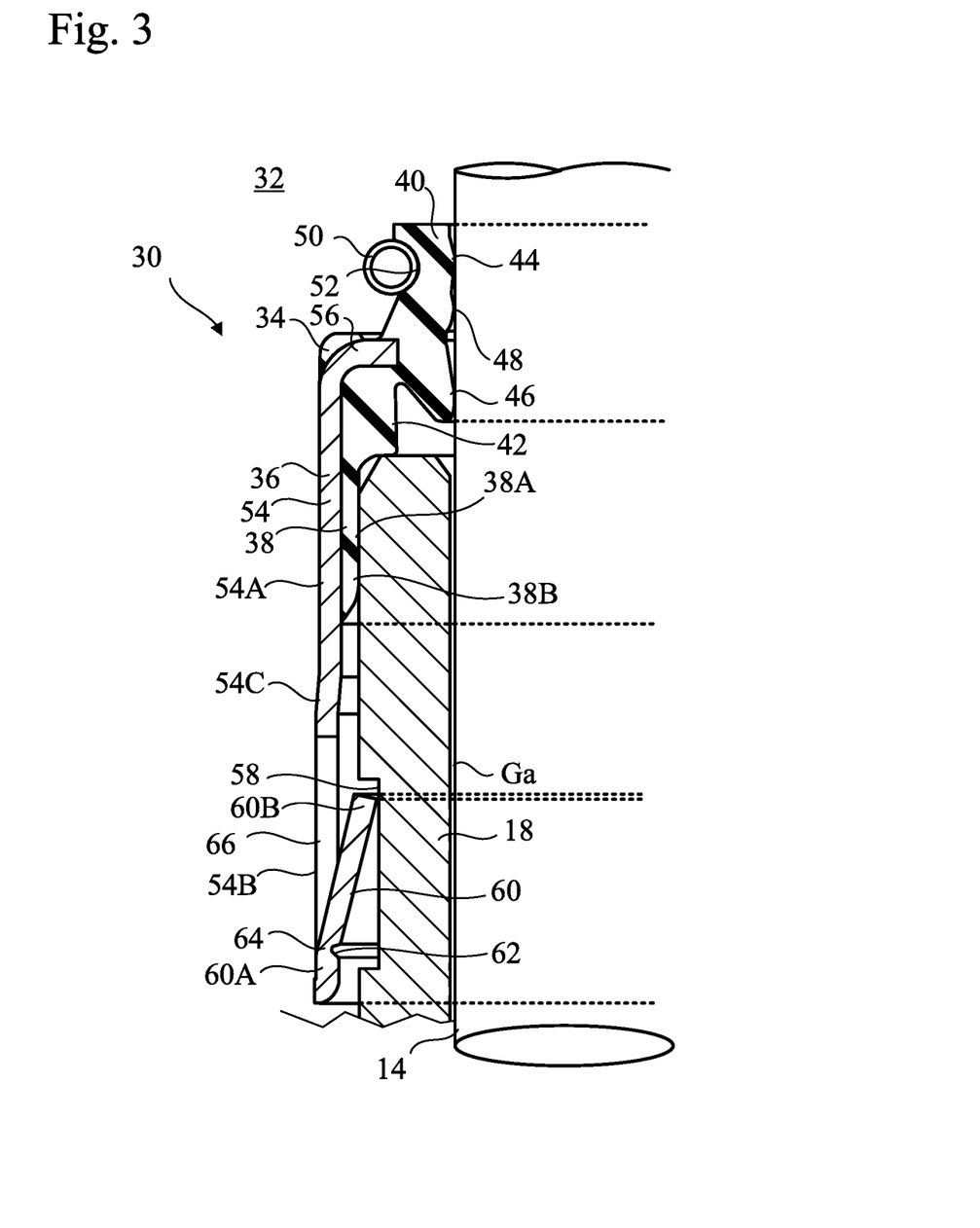
FIG. 3 is a cross-sectional view showing a usage state of the sealing device according to the embodiment.

With reference to FIGS. 2 to 7, the sealing structure including the valve-stem seal 30 and the valve-stem guide 18 will be described in more detail. FIG. 2 shows the valve-stem seal 30 that is not in contact with the valve stem 14 and the valve-stem guide 18, and in FIG. 2, the valve stem 14 and the valve-stem guide 18 are indicated by phantom lines for reference. FIG. 3 shows the valve-stem seal 30 in use that is in contact with the valve stem 14 and the valve-stem guide 18. Although the valve-stem seal 30 and the valve-stem guide 18 have cylindrical shapes, only their left side portions are shown in FIGS. 2 and 3.

Figure 4:
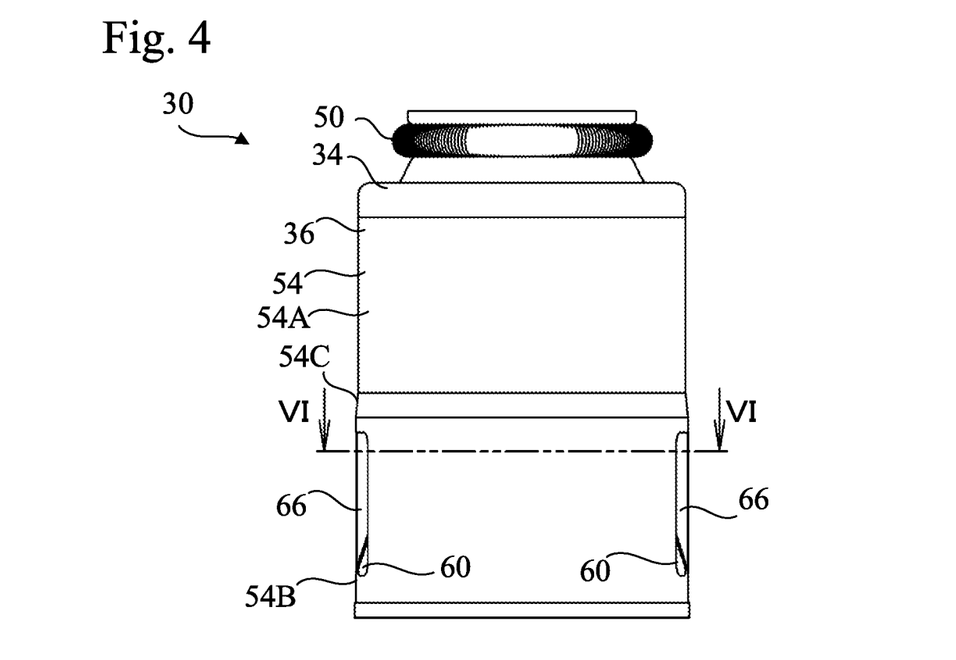
FIG. 4 is a front view showing the sealing device according to the embodiment.
Figure 5:
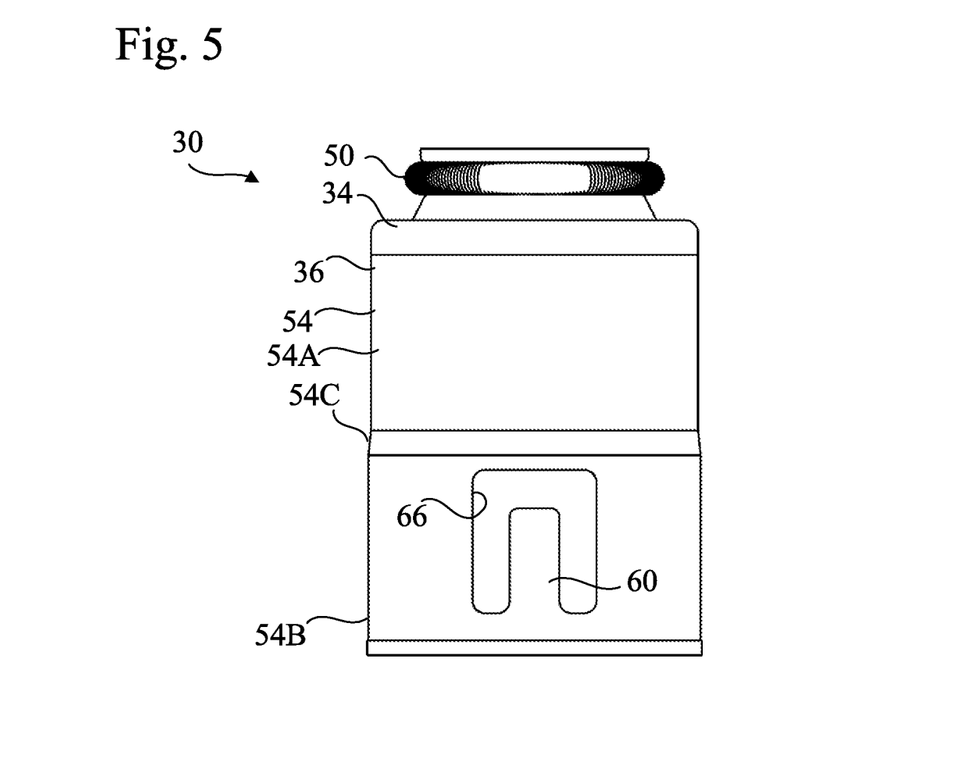
FIG. 5 is a side view showing the sealing device according to the embodiment.
Figure 6:
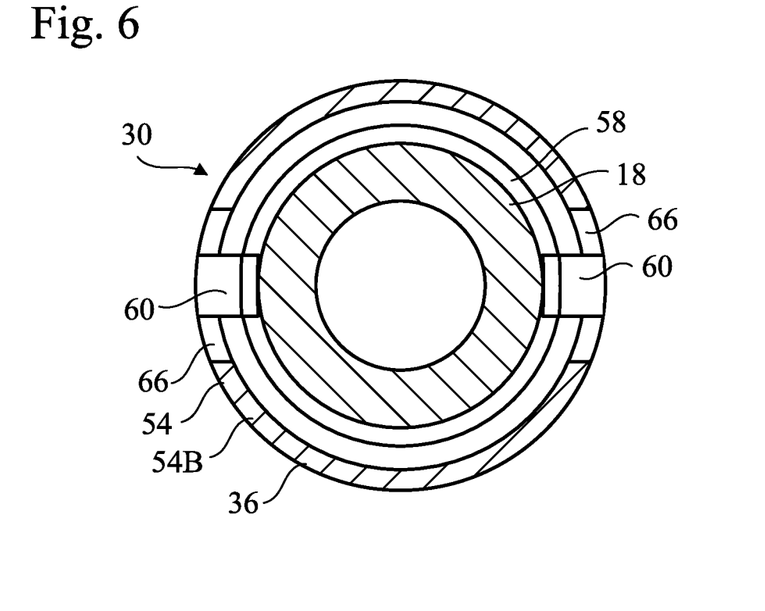
FIG. 6 is a cross-sectional view taken along line VI-VI in FIG. 4.

FIG. 4 is a front view showing the valve-stem seal 30. FIG. 5 is a side view showing the valve-stem seal 30. FIG. 6 is a cross-sectional view taken along the line VI-VI in FIG. 4, and shows not only the cross section of the valve-stem seal 30, but also the cross section of the valve-stem guide 18.

As shown in FIGS. 2 and 3, the inner peripheral surface of the valve-stem guide 18 is spaced apart with a clearance Ga from the outer peripheral surface of the valve stem 14. A high pressure in the combustion chamber 4 (hereinafter referred to as "back pressure") is applied to the valve-stem seal 30 through the clearance Ga. In particular, a high back pressure in the exhaust stroke is applied to the valve-stem seal 30 provided in the exhaust port 8.

The valve-stem seal 30 has a double structure having an elastic ring 34 and a rigid ring 36. The elastic ring 34 is made of an elastic material (for example, an elastomer). The rigid ring 36 is formed of a rigid material (for example, metal), and is brought into close contact with the elastic ring 34 to reinforce the elastic ring 34.

The elastic ring 34 includes an elastic-ring cylindrical part 38, an inner circular annular part 40, and a connecting circular annular part 42. The valve-stem guide 18 is fitted into the elastic-ring cylindrical part 38 by an interference fit manner. Therefore, the inner peripheral surface of the elastic-ring cylindrical part 38 is in contact with the outer peripheral surface of the valve-stem guide 18.

Protruding annular-wall portion 38A and 38B are formed on the inner peripheral surface of the elastic-ring cylindrical part 38. Each protruding annular-wall portion is a protrusion that is continuous in the circumferential direction. In a case in which the valve-stem guide 18 is engaged into the elastic-ring cylindrical part 38, the protruding annular-wall portions 38A and 38B are compressed radially outward and elastically deformed. FIG. 2 shows the valve-stem guide 18 by phantom lines and shows the protruding annular-wall portions 38A and 38B in an uncompressed state. FIG. 3 shows the projecting annular wall portions 38A and 38B compressed since the valve-stem seal 30 is attached to the valve-stem guide 18.

The inner annular part 40 is located above the elastic-ring cylindrical part 38 and has a smaller outer diameter and a smaller inner diameter in comparison with the elastic-ring cylindrical part 38.

The connecting circular annular part 42 connects the upper end of the elastic-ring cylindrical part 38 and the inner circular annular part 40. The end surface of the valve-stem guide 18 is in contact with the connecting circular annular part 42.

A main lip 44, a back-pressure lip 46, and multiple protrusions 48 are formed on the inner annular part 40. The outer peripheral surface of the valve stem 14 is slidably in contact with the main lip 44 and the back-pressure lip 46. The main lip 44 is mainly provided so that engine oil in the oil chamber 32 does not flow excessively toward the valve-stem guide 18. The back-pressure lip 46 is provided for receiving the back pressure applied to the valve-stem seal 30 through the clearance Ga between the valve stem 14 and the valve-stem guide 18 so that the main lip 44 is not excessively deformed by an excessive back pressure. Multiple protrusions 48 are intermittently arranged in the circumferential direction so as to surround the valve stem 14. These protrusions 48 are provided so that the main lip 44 and the back-pressure lip 46 are in contact with the valve stem 14 at a substantially uniform contact pressure over the entire circumference of the valve stem 14 in the state in which the valve-stem seal 30 is attached to the valve-stem guide 18.

As shown in FIG. 3, when in contact with the valve stem 14, the main lip 44 and the back-pressure lip 46 are deformed and in contact with the outer peripheral surface of the valve stem 14 over the entire circumference. However, in order to supply an appropriate amount of engine oil to the clearance Ga between the valve stem 14 and the valve-stem guide 18, minute gaps (not shown) are provided between the main lip 44 and the outer peripheral surface of the valve stem 14, and minute gaps (not shown) are also provided between the back-pressure lip 46 and the outer peripheral surface of the valve stem 14.

Although not necessary, a garter spring 50 may be wound around the inner annular part 40, as shown in FIG. 3. In this embodiment, a circumferential groove 52 that receives the garter spring 50 is formed on the outer circumferential surface of the inner annular part 40. The garter spring 50 presses the main lip 44 and the protrusions 48 inward to increase the contact pressure of the main lip 44 and the protrusions 48 against the valve stem 14.

The rigid ring 36 includes a rigid-ring cylindrical part 54 and a circular annular part 56. The rigid-ring cylindrical part 54 is fixed to the outer peripheral surface of the elastic-ring cylindrical part 38 of the elastic ring 34. Therefore, the elastic-ring cylindrical part 38 of the elastic ring 34 is surrounded by the rigid-ring cylindrical part 54 of the rigid ring 36 over the entire circumference, and movement or expansion of the elastic-ring cylindrical part 38 in the radial direction is restricted. The circular annular part 56 is fixed to the inner annular part 40 and the connecting annular portion 42 of the elastic ring 34.

The rigid-ring cylindrical part 54 has a small-diameter cylindrical portion 54A, a large-diameter cylindrical portion 54B, and a connecting truncated-cone portion 54C. These are arranged coaxially with one another. The large-diameter cylindrical portion 54B has a larger outer diameter and a larger inner diameter in comparison with the small-diameter cylindrical portion 54A. The connecting truncated-cone portion 54C smoothly connects the small-diameter cylindrical portion 54A with the large-diameter cylindrical portion 54B.

The small-diameter cylindrical portion 54A is arranged closer to the elastic ring 34 than the large-diameter cylindrical portion 54B, is fixed to the outer peripheral surface of the elastic-ring cylindrical part 38 of the elastic ring 34, and surrounds the elastic-ring cylindrical part 38 over the entire circumference. The connecting truncated cone part 54C and the large-diameter cylindrical portion 54B are arranged at positions away from the elastic ring 34.

At least one recess 58 is formed on the outer peripheral surface of the valve-stem guide 18. In this embodiment, the recess 58 is one circumferential groove that is continuous in the circumferential direction of the valve-stem guide 18.

Multiple hook hasps 60 are intermittently formed along the circumferential direction on the large-diameter cylindrical portion 54B of the rigid-ring cylindrical part 54. As shown in FIGS. 4 and 6, in this embodiment, the number of hook hasps 60 is two, but it may be three or more. Preferably, as shown in FIGS. 4 and 6, these hook hasps 60 are arranged at equiangular intervals in the circumferential direction. However, the angular intervals of the hook hasps 60 may be unequal.

As shown in FIGS. 2 and 3, each hook hasp 60 has a root portion 60A and a distal end portion 60B. The root portion 60A is a part of the large-diameter cylindrical portion 54B, and each hook hasp 60 extends radially inward and upward (to the side of the main lip 44) from the root portion 60A, in which the distal end portion 60B is engaged in the recess 58 of the valve-stem guide 18.

In this embodiment, the recess 58 of the valve-stem guide 18 is a single circumferential groove that is continuous in the circumferential direction, but multiple recesses 58 may be formed in the circumferential direction on the outer peripheral surface of the valve-stem guide 18 intermittently (only at the positions into which the hook hasp 60 are engaged).

Since each hook hasp 60 is engaged in the recess 58 of the valve-stem guide 18, even when a high back pressure is applied to the valve-stem seal 30 through the clearance Ga between the valve stem 14 and the valve-stem guide 18, the valve-stem seal 30 is unlikely to come off from the valve-stem guide 18. In other words, the hook hasps 60 function as locks for the valve-stem seal 30.

A groove 62 is formed on the radially inner surface of the root portion 60A of the hook hasp 60, whereby a thin portion 64 thinner than other parts of the hook hasp is formed on the root portion 60A. Therefore, the hook hasp 60 has greater flexibility in the thin portion 64 than in other parts.

As shown in FIGS. 4 to 7, slits 66 each defining the contour of the hook hasp 60 are formed in the large-diameter cylindrical portion 54B of the rigid-ring cylindrical part 54. The slits 66 penetrate the large-diameter cylindrical portion 54B. As shown in FIG. 5, the slit 66 has a substantially inverted U shape and surrounds the hook hasp 60, which is substantially rectangular, in three directions.

Figure 7:
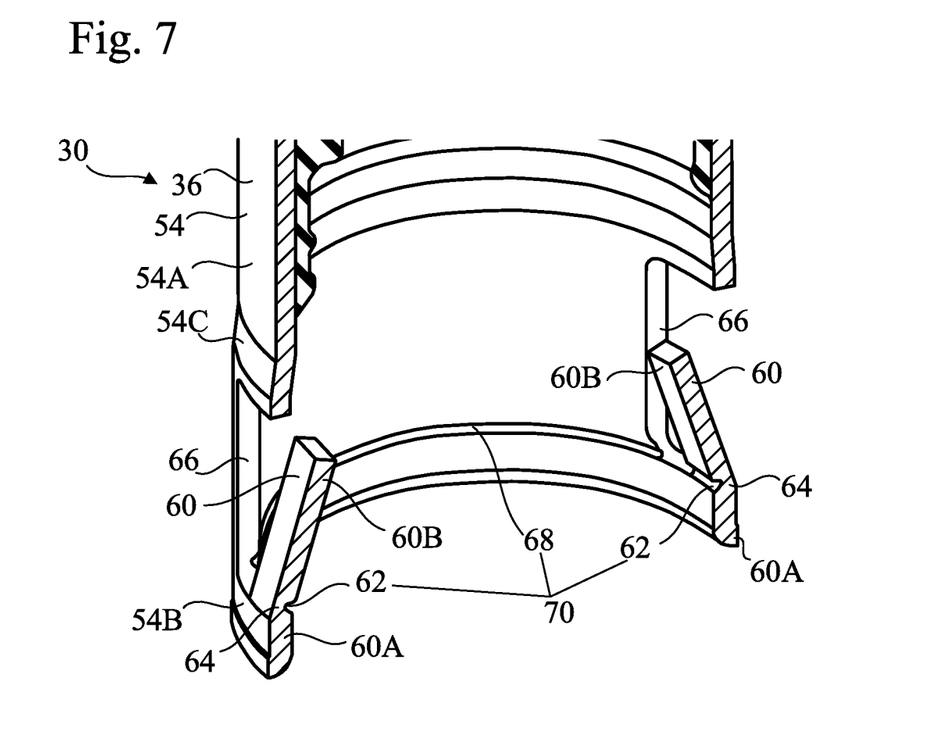
FIG. 7 is a perspective view in which a part of the sealing device according to the embodiment is cutaway.

As shown in FIG. 7, grooves 68 are formed at positions at which there is no hook hasp 60 on the inner peripheral surface of the large-diameter cylindrical portion 54B of the rigid-ring cylindrical part 54. The grooves 68 cooperate with the grooves 62 of the root portions 60A of the hook hasps 60 to constitute a single circumferential groove 70 that is continuous in the circumferential direction of the large-diameter cylindrical portion 54B. In other words, the circumferential groove 70 is divided by the slits 66, whereby the grooves 62 and the grooves 68 are formed.

Figure 8:
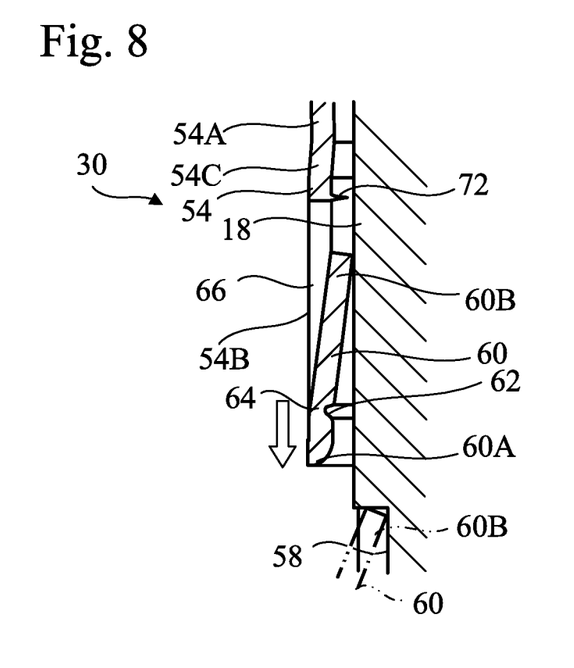
FIG. 8 is a cross-sectional view showing a state in which the sealing device according to the embodiment is being attached to a guide.

FIG. 8 shows a hook hasp 60 when the valve-stem seal 30 is being attached to the valve-stem guide 18, that is, when the valve-stem guide 18 is fitted into the valve-stem seal 30. At this time, the distal end portion 60B is slid on the outer peripheral surface of the valve-stem guide 18, as indicated by the arrow until the distal end portion 60B of the hook hasp 60 enters the recess 58 as indicated by the phantom line. At this time, the hook hasp 60, particularly the thin portion 64 is bent, so that the outer peripheral surface of the valve-stem guide 18 is unlikely to be damaged. As indicated by the phantom line, once the distal end portion 60B of the hook hasp 60 is engaged into the recess 58, the hook hasp 60 is unlikely to come off from the recess 58, so that even if a high back pressure is applied to the valve-stem seal 30 in the direction opposite to the arrow in the figure, the valve-stem seal 30 is unlikely to come off from the valve-stem guide 18.

In this embodiment, the rigid-ring cylindrical part 54 includes the small-diameter cylindrical portion 54A and the large-diameter cylindrical portion 54B, in which the hook hasps 60 are formed in the large-diameter cylindrical portion 54B. The large-diameter cylindrical portion 54B is located farther from the outer peripheral surface of the valve-stem guide 18 than the small-diameter cylindrical portion 54A. After the hook hasps 60 are formed on the rigid-ring cylindrical part 54, there is a likelihood that burrs 72 remain on the inner peripheral surface of the rigid-ring cylindrical part 54. However, since the hook hasps 60 are formed in the large-diameter cylindrical portion 54B, even if the burrs 72 remain in the large-diameter cylindrical portion 54B, when the valve-stem seal 30 is attached to the valve-stem guide 18, the burrs 72 are unlikely to come into contact with the outer peripheral surface of the valve-stem guide 18, and the outer peripheral surface of the valve-stem guide 18 is unlikely to be damaged.

Figure 9:
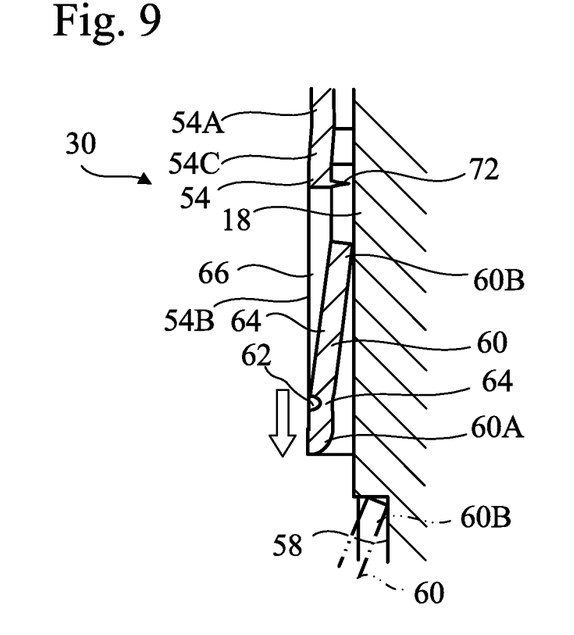
FIG. 9 is a cross-sectional view showing a state in which a sealing device according to a modification is being attached to the guide.

In the embodiment, as shown in FIG. 8, the groove 62 is formed on the radially inner surface of the root portion 60A of the hook hasp 60, thereby providing the thin portion 64. However, as shown in FIG. 9, the groove 62 may be formed on the radially outer surface of the root portion 60A of the hook hasp 60 for providing the thin portion 64.

However, the embodiment in which the groove 62 is formed on the radial inner surface of the root portion 60A of the hook hasp 60 as shown in FIG. 8 is more advantageous. This is because, at the time of manufacturing the rigid ring 36, which will be described later, each hook hasp 60 can be easily shaped by folding at the groove 62 as a crease, as compared with the case of FIG. 9.

Next, a manufacturing method of the valve-stem seal 30 that is a sealing device, particularly a method of forming the hook hasps 60 of the rigid-ring cylindrical part 54, will be described.

First, the circumferential groove 70 (see FIG. 7) is formed on the inner peripheral surface or the outer peripheral surface of the large-diameter cylindrical portion 54B of the rigid-ring cylindrical part 54. The circumferential groove 70 may be formed by cutting work, or when the rigid ring 36 is manufactured by pressing work or casting work using a mold, the circumferential groove 70 may also be formed by the mold.

Next, slits 66 for defining the contours of the hook hasps 60 are formed in the large-diameter cylindrical portion 54B by, for example, cutting work or punching work. Since the slit 66 extends along the longitudinal direction of the rigid-ring cylindrical part 54 and intersects the circumferential groove 70, the grooves 62 and the grooves 68 are left in the large-diameter cylindrical portion 54B by the formation of the slits 66.

Then, the hook hasps 60 are folded at the thin portions 64, in particular, at the grooves 62, which are the remaining portions of the circumferential groove 70, as creases. In this way, the hook hasps 60 are formed.

The elastic ring 34 and the rigid ring 36 are integrated before or after the hook hasps 60 are shaped. For example, the elastic ring 34 and the rigid ring 36 can be integrated by placing the rigid ring 36 inside a mold, putting the material of the elastic ring 34 into the mold, and molding the elastic ring 34 by pressing or injection molding.

In this manufacturing method, the thin portions 64 of the hook hasps 60 can be formed by forming the circumferential groove 70 before forming the slits 66 to define the contours of the hook hasps 60. Accordingly, it is easier and more efficient to form the thin portions 64 in comparison with a case in which the thin portions 64 of the hook hasps 60 are formed after the outlines of the hook hasps 60 are defined.

Modifications

Although an embodiment of the present invention has been described, the foregoing description is not intended to limit the present invention. Various modifications including omission, addition, and substitution of structural elements may be made within the scope of the present invention.

For example, in the above embodiment, the sealing device is the valve-stem seal 30 that seals the valve stem 14 and the valve-stem guide 18. However, the present invention can also be applied to a sealing device that seals a piston (reciprocable rod) a piston guide in a piston-type fuel pump.

The inner peripheral surface of the elastic-ring cylindrical part 38 of the elastic ring 34 may be coated with a resin material having a small coefficient of friction and which is harder than the elastomer so that the valve-stem guide 18 can be easily fitted into the elastic-ring cylindrical part 38. Examples of such resin materials include polyetheretherketone (PEEK), polyphenylene sulfide (PPS), and polytetrafluoroethylene (PTFE).

At least one of the main lip 44, the back-pressure lip 46, and the protrusions 48 of the elastic ring 34 may be coated with such a resin material to reduce abrasion thereof.

Aspects of the present invention are also set out in the following numbered clauses:

Clause 1. A sealing device for sealing a rod having a cylindrical part and a cylindrical guide that guides reciprocation of the rod in an axial direction of the rod, comprising:

an elastic ring formed of an elastic material; and
a rigid ring formed of a rigid material fixed to the elastic ring for reinforcing the elastic ring,
the elastic ring comprising a lip with which an outer peripheral surface of the rod is in slidable contact,
the rigid ring comprising a rigid-ring cylindrical part located radially outside an end portion of the guide,
the rigid-ring cylindrical part comprising multiple hook hasps engaged into at least one recess formed on an outer peripheral surface of the guide,
each of the multiple hook hasps comprising a root portion and a distal end portion located radially inward of the root portion and fitted into the recess,
a thin portion being formed at the root portion of the hook hasp, the thin portion being thinner than other parts of the hook hasp.

Clause 2. The sealing device according to clause 1, wherein the thin portion is formed by a groove formed on a radially inward surface of the root portion of the hook hasp.

According to this clause, in manufacturing the rigid ring, each hook hasp can be easily fold-shaped at the groove, as compared with a case in which such a groove is formed on a radially outward surface of the root portion.

Clause 3. The sealing device according to clause 1 or 2, wherein the rigid-ring cylindrical part comprises a small-diameter cylindrical portion and a large-diameter cylindrical portion that is coaxial with the small-diameter cylindrical portion and has an inner diameter greater than that of the small-diameter cylindrical portion, the small-diameter cylindrical portion being arranged closer to the elastic ring than the large-diameter cylindrical portion, the hook hasps being formed in the large-diameter cylindrical portion.

The large-diameter cylindrical portion is located farther from the outer peripheral surface of the guide than the small-diameter cylindrical portion. After the hook hasps are formed on the rigid-ring cylindrical part, there is a likelihood that burrs remain on the inner peripheral surface of the rigid-ring cylindrical part. However, according to this clause, since the hook hasps are formed in the large-diameter cylindrical portion, even if burrs remain in the large-diameter cylindrical portion, when the sealing device is attached to the guide for the bar, the burrs are unlikely to come into contact with the outer peripheral surface of the guide, and the outer peripheral surface of the guide is unlikely to be damaged.

Clause 4. A method of manufacturing the sealing device according to any one of clauses 1-3, comprising:

forming a circumferential groove that is continuous in a circumferential direction on an inner peripheral surface of the rigid-ring cylindrical part;

forming slits in the rigid-ring cylindrical part, the slits extending along the longitudinal direction of the rigid-ring cylindrical part and intersecting the circumferential groove for defining contours of the hook hasps; and folding the hook hasps at the thin portions corresponding to the circumferential groove.

In accordance with this clause, the thin portions of the hook hasps can be formed by forming the circumferential groove before forming the slits to define the contours of the hook hasps. Accordingly, it is easier and more efficient to form the thin portions in comparison with a case in which the thin portions of the hook hasps are formed after the outlines of the hook hasps are defined.

REFERENCE SYMBOLS

14: Valve Stem (Rod)
18: Valve-Stem Guide (Guide)

30: Valve-Stem Seal (Sealing Device)
32: Oil Chamber
34: Elastic Ring
36: Rigid Ring
38: Elastic-Ring Cylindrical Part
44: Main Lip
46: Back-Pressure Lip
54: Rigid-Ring Cylindrical Part
54A: Small-Diameter Cylindrical Portion
54B: Large-Diameter Cylindrical Portion
54C: Connecting Truncated-Cone Portion
60: Hook Hasp
60A: Root Portion
60B: Distal End Portion
62: Groove
64: Thin Portion
66: Slit
70: Circumferential Groove
Ga: Clearance

The invention claimed is:

1. A sealing device for sealing a rod having a cylindrical part and a cylindrical guide that guides reciprocation of the rod in an axial direction of the rod, comprising:
an elastic ring formed of an elastic material; and
a rigid ring formed of a rigid material fixed to the elastic ring for reinforcing the elastic ring,
the elastic ring comprising a lip with which an outer peripheral surface of the rod is in slidable contact,
the rigid ring comprising a rigid-ring cylindrical part located radially outside an end portion of the guide,
the rigid-ring cylindrical part comprising multiple hook hasps engaged into at least one recess formed on an outer peripheral surface of the guide,
each of the multiple hook hasps comprising a root portion and a distal end portion located radially inward of the root portion and fitted into the recess,
a thin portion being formed at the root portion of each of the hook hasps, the thin portion being thinner than other parts of the hook hasp, and
the thin portion being formed by a groove formed on a radial inner surface of the root portion of each of the hook hasps.

2. The sealing device according to claim 1, wherein the rigid-ring cylindrical part comprises a small-diameter cylindrical portion and a large-diameter cylindrical portion that is coaxial with the small-diameter cylindrical portion and has an inner diameter greater than that of the small-diameter cylindrical portion, the small-diameter cylindrical portion being arranged closer to the elastic ring than the large-diameter cylindrical portion, the hook hasps being formed in the large-diameter cylindrical portion.

3. A sealing device for sealing a rod having a cylindrical part and a cylindrical guide that guides reciprocation of the rod in an axial direction of the rod, comprising:
an elastic ring formed of an elastic material; and
a rigid ring formed of a rigid material fixed to the elastic ring for reinforcing the elastic ring,
the elastic ring comprising a lip with which an outer peripheral surface of the rod is in slidable contact,
the rigid ring comprising a rigid-ring cylindrical part located radially outside an end portion of the guide,
the rigid-ring cylindrical part comprising multiple hook hasps engaged into at least one recess formed on an outer peripheral surface of the guide,
each of the multiple hook hasps comprising a root portion and a distal end portion located radially inward of the root portion and fitted into the recess,
a thin portion being formed at the root portion of the hook hasp, the thin portion being thinner than other parts of the hook hasp, the rigid-ring cylindrical part comprising a small-diameter cylindrical portion and a large-diameter cylindrical portion that is coaxial with the small-diameter cylindrical portion and has an inner diameter greater than that of the small-diameter cylindrical portion, the small-diameter cylindrical portion being arranged closer to the elastic ring than the large-diameter cylindrical portion, the hook hasps being formed in the large-diameter cylindrical portion.

4. A method of manufacturing the sealing device, the sealing device adapted for sealing a rod having a cylindrical part and a cylindrical guide that guides reciprocation of the rod in an axial direction of the rod, the sealing device comprising:
an elastic ring formed of an elastic material; and
a rigid ring formed of a rigid material fixed to the elastic ring for reinforcing the elastic ring,
the elastic ring comprising a lip with which an outer peripheral surface of the rod is in slidable contact,
the rigid ring comprising a rigid-ring cylindrical part located radially outside an end portion of the guide,
the rigid-ring cylindrical part comprising multiple hook hasps engaged into at least one recess formed on an outer peripheral surface of the guide,
each of the multiple hook hasps comprising a root portion and a distal end portion located radially inward of the root portion and fitted into the recess,
a thin portion being formed at the root portion of the hook hasp, the thin portion being thinner than other parts of the hook hasp, the method comprising:
forming a circumferential groove that is continuous in a circumferential direction on an inner peripheral surface of the rigid-ring cylindrical part;
forming slits in the rigid-ring cylindrical part, the slits extending along the longitudinal direction of the rigid-ring cylindrical part and intersecting the circumferential groove for defining contours of the hook hasps; and
folding the hook hasps at the thin portions corresponding to the circumferential groove.

* * * * *